(12) United States Patent
Cai et al.

(10) Patent No.: US 11,785,117 B2
(45) Date of Patent: Oct. 10, 2023

(54) METHODS AND APPARATUSES FOR SERVICE DISCOVERY

(71) Applicant: Telefonaktiebolaget LM Ericsson (publ), Stockholm (SE)

(72) Inventors: Xuejun Cai, Täby (SE); Zhang Fu, Stockholm (SE); Kun Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/622,734

(22) PCT Filed: Jun. 26, 2019

(86) PCT No.: PCT/SE2019/050620
§ 371 (c)(1),
(2) Date: Dec. 24, 2021

(87) PCT Pub. No.: WO2020/263136
PCT Pub. Date: Dec. 30, 2020

(65) Prior Publication Data
US 2022/0256011 A1    Aug. 11, 2022

(51) Int. Cl.
*H04L 67/61* (2022.01)
*H04L 67/51* (2022.01)
(Continued)

(52) U.S. Cl.
CPC .......... *H04L 67/61* (2022.05); *H04L 43/0852* (2013.01); *H04L 67/51* (2022.05); *H04L 67/63* (2022.05)

(58) Field of Classification Search
CPC ...... H04L 67/51; H04L 67/63; H04L 43/0852
See application file for complete search history.

(56) References Cited

U.S. PATENT DOCUMENTS

| 2008/0168464 A1* | 7/2008 | Keladi ................. G06F 9/3867 718/105 |
| 2014/0215184 A1* | 7/2014 | Branson ................. G06F 15/80 712/30 |

(Continued)

OTHER PUBLICATIONS

International Search Report and Written Opinion of the International Searching Authority, PCT/SE2019/050620, dated Jul. 10, 2010, 17 pages.

(Continued)

*Primary Examiner* — Viet D Du
(74) *Attorney, Agent, or Firm* — SAGE PATENT GROUP

(57) ABSTRACT

Embodiments described herein provide methods and apparatuses for relate to methods and apparatuses for providing processing functions by microservices in a service. A first microservice is capable of providing a first processing function in a service comprising a plurality of microservices. The method includes receiving a processing request to provide the first processing function; obtaining a sequence of a plurality of microservices associated with the processing request, wherein the sequence comprises the first microservice; obtaining a current latency requirement associated with the remaining microservices in the sequence; obtaining an estimated latency associated with the remaining microservices in the sequence; and placing the processing request in a processing queue based on a comparison between the current latency requirement and the estimated latency.

14 Claims, 9 Drawing Sheets

(51) Int. Cl.
  *H04L 67/63* (2022.01)
  *H04L 43/0852* (2022.01)

(56) References Cited

U.S. PATENT DOCUMENTS

| | | |
|---|---|---|
| 2018/0034832 A1 | 2/2018 | Ahuja et al. |
| 2018/0309821 A1 | 10/2018 | Byers et al. |
| 2019/0297150 A1* | 9/2019 | Takahashi ............... H04L 67/10 |

OTHER PUBLICATIONS

3rd Generation Partnership Project; Technical Specification Group Services and System Aspects; System Architecture for the 5G System; Stage 2 (Release 15), 3GPP TS 23.501 V15.3.0 (Sep. 2018), 226 pages.

3rd Generation Partnership Project; Technical Specification Group Services and System Aspects; Procedures for the 5G System; Stage 2 (Release 15), 3GPP TS 23.502 V15.3.0 (Sep. 2018), 330 pages.

* cited by examiner

METHODS AND APPARATUSES FOR
SERVICE DISCOVERY

CROSS REFERENCE TO RELATED
APPLICATIONS

This application is a 35 U.S.C. § 371 national stage application of PCT International Application No. PCT/SE2019/050620 filed on Jun. 26, 2019, the disclosure and content of which is incorporated by reference herein in its entirety.

TECHNICAL FIELD

Embodiments described herein relate to methods and apparatuses for providing processing functions by microservices in a service.

BACKGROUND

In recent years, with the increasing popularity and maturity of lightweight virtualization technology (for example, the container) the microservices based architecture has been adopted by more and more applications or services.

FIG. 1 illustrates an example of a microservice architecture.

In the microservice architecture a single service is decomposed into a plurality of modular microservices (S1 to S6) which may comprise for example containers or virtual machines. The microservices may be small in size, messaging enabled, bounded by contexts, decentralized, deployed, and/or built and released independently with automated process. The microservices may work together and communicate with each other through a Web Application processing interface (API) 101 (e.g., RESTful API) or message queues. Each microservice may expose an API and may be invoked by other microservices or an external client (102a to 102c). The processing functions performed by each microservice can then be used to provide the single service.

There are many scenarios in which such microservice based architectures may be used. For example, in the current 3gpp specification for 5G Core (5GC) network, the 5G System architecture may leverage service-based interactions between Control Plane (CP) Network Functions where identified.

FIG. 2 illustrates an example of a basic Service Based Architecture (SBA) of the core network. Network Functions (NFs) expose their abilities as services that can be used by other NFs. The NFs may therefore effectively function as microservices. For example, the Access and Mobility Management Function (AMF) may provide a service that enables a different NF to communicate with the UE and/or the AN (Access Network) through the AMF; the Session Management Function (SMF) may provide a service that allows consumer NFs to handle the Protocol Data Unit (PDU) sessions of UEs.

The NFs in the core network may expose their services (or processing functions) by registering themselves with the NRF (Network Repository Function). The NRF may also offer service discovery to enable different NFs to find each other.

To achieve a specific procedure in the system based architecture, a series of microservices performed by different network functions may need to be called. For example, in a UE registration procedure, a UE may send a registration request, the AMF may call the authentication service to AUSF (Authentication Sever Function), and the AUSF may call the service of UDM (Unified Data Management) to retrieve the authentication related data for the UE. This single service, UE registration, is therefore formed from a plurality of chained microservices performed by the different NFs. Another example could be the PDU session establishment procedure, where the UE may send the PDU session establishment request to AMF, then AMF may call the PDU session service in SMF, and the SMF may call the UDM's service to retrieve the corresponding subscription data, after that the SMF may call the service in PCF (Policy Control Function) to retrieve the corresponding policy for the PDU session.

SUMMARY

According to some embodiments there is provided a method performed by a first microservice capable of providing a first processing function in a service comprising a plurality of microservices. The method comprises receiving a processing request to provide the first processing function; obtaining a sequence of a plurality of microservices associated with the processing request, wherein the sequence comprises the first microservice; obtaining a current latency requirement associated with the remaining microservices in the sequence; obtaining an estimated latency associated with the remaining microservices in the sequence; and placing the processing request in a processing queue based on a comparison between the current latency requirement and the estimated latency.

According to some embodiments there is provided a method in a service call procedure repository, SCPR. The method comprises storing at least one sequence of microservices; and storing information relating to a step latency associated with each step in each sequence of microservices, wherein a step comprises one of a microservice in the sequence or a hop between pair of adjacent microservices in said sequence.

According to some embodiments there is provided a method in a monitoring function in a network. The method comprises monitoring one or more microservices to obtain information relating to a step latency associated with each step in at least one sequence of microservices, wherein a step comprises one of a microservice or a hop between pair of adjacent microservices in said sequence; and transmitting the information to a service call procedure repository.

According to some embodiments there is provided a computer system comprising processing circuitry and a memory containing a first microservice capable of providing a first processing function in a service comprising a plurality of microservices. When the first microservice is executed by the processing circuitry it instructs the processing circuitry to: receive a processing request to provide the first processing function; obtain a sequence of a plurality of microservices associated with the processing request, wherein the sequence comprises the first microservice; obtain a current latency requirement associated with the remaining microservices in the sequence; obtain an estimated latency associated with the remaining microservices in the sequence; and place the processing request in a processing queue based on a comparison between the current latency requirement and the estimated latency.

According to some embodiments there is provided a service call procedure repository, SCPR. The SCPR comprises processing circuitry configured to: store at least one sequence of microservices; and store information relating to a step latency associated with each step in each sequence of microservices, wherein a step comprises one of a microservice in the sequence or a hop between pair of adjacent microservices in said sequence.

According to some embodiments there is provided a monitoring function in a network. The monitoring function comprises processing circuitry configured to monitor one or more microservices to obtain information relating to a step latency associated with each step in at least one sequence of microservices, wherein a step comprises one of a microservice or a hop between pair of adjacent microservices in said sequence; and transmit the information to a service call procedure repository.

BRIEF DESCRIPTION OF THE DRAWINGS

For a better understanding of the embodiments, and to show how they may be put into effect, reference will now be made, by way of example only, to the accompanying drawings, in which:—

DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly, as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
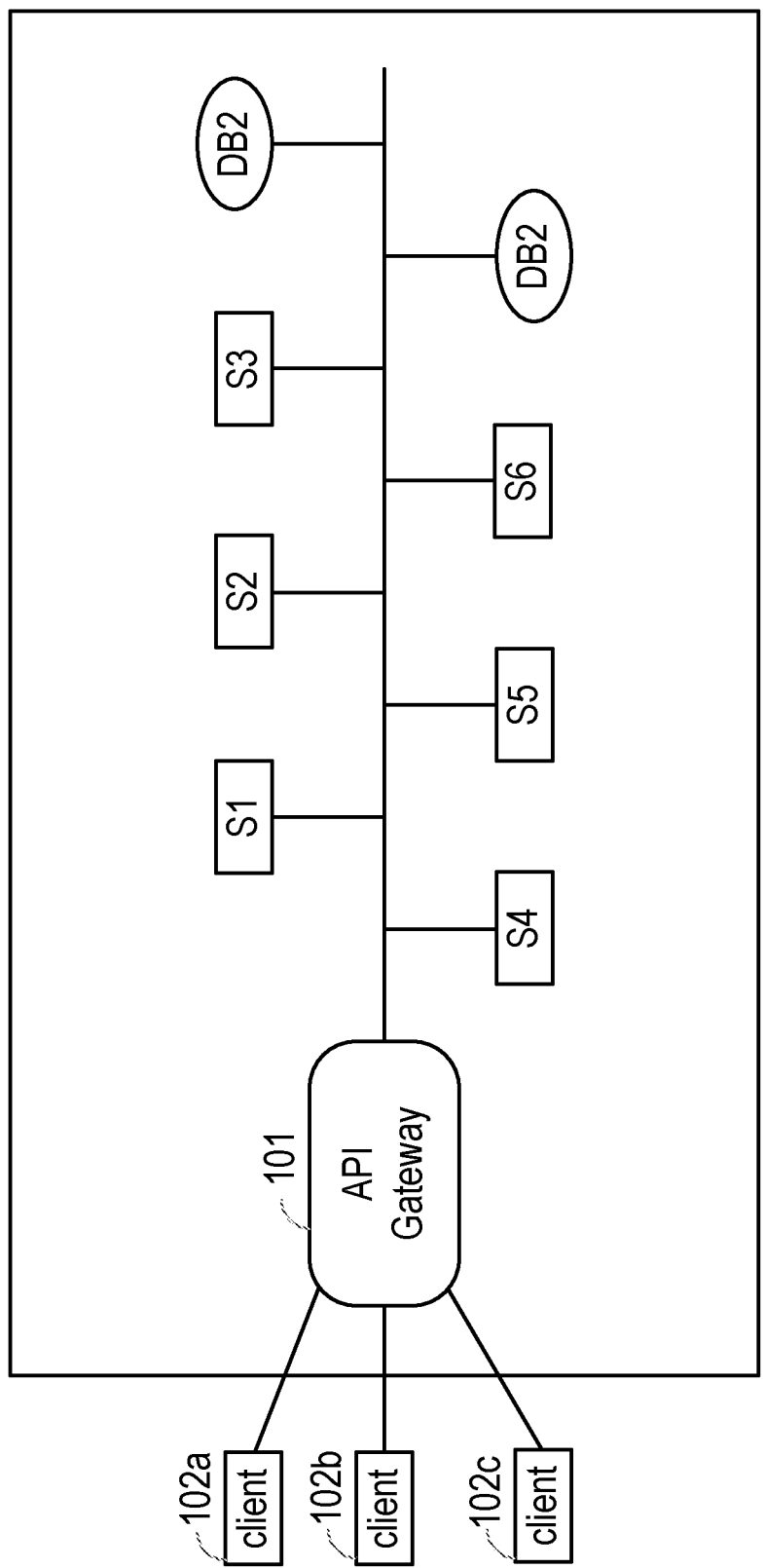
FIG. 1 illustrates an example of a microservice architecture.
Figure 2:
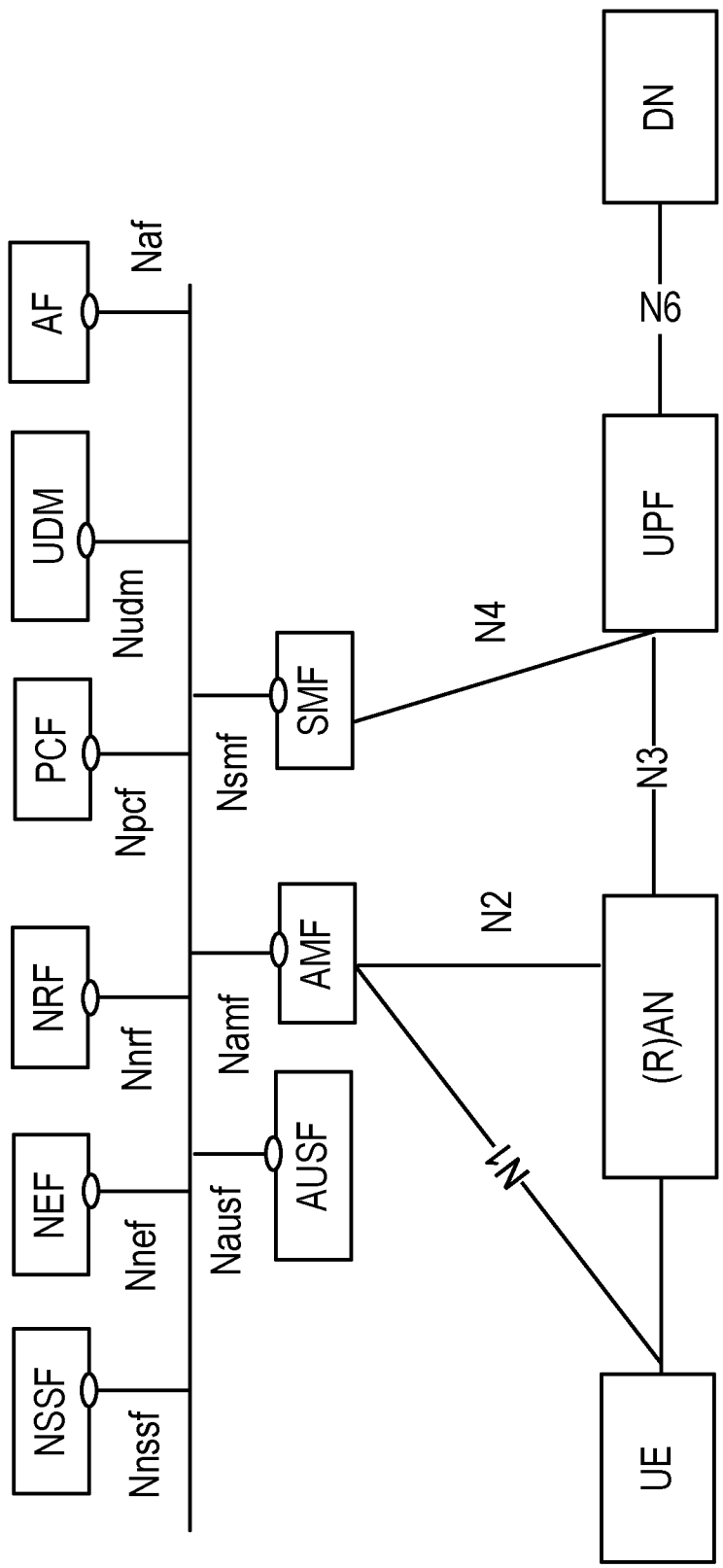
FIG. 2 illustrates an example of a basic Service Based Architecture of the core network.

In a microservice based application, the processing request from a client may involve multiple interactions among the microservices in order to provide the service, for example, as shown in the FIG. 1, a processing request to microservice s1 will trigger the invocation of service s2, and consequently s4 and s6 will be called, i.e., the processing request will introduce a microservice call sequence. Based on the type of the processing request (e.g. UE registration, etc), different microservice call sequences may be invoked for each incoming processing request.

For a specific processing request, it may be desirable that the service is provided within a certain time limit. For example, UE registration as described above, may be required to be finished within 100 ms, or a handover procedure may be required to be finished within 50 ms, etc. These delay requirements may be important for the Quality of Service (or Quality of Experience) for some latency sensitive use cases, e.g. gaming, Augmented or Virtual Reality (AR/VR), etc. Since different service requests may have different latency (time) requirements, it may be desirable that the microservice requests to the same microservice, but belonging to different service requests, be treated differently.

For example, both the UE registration service request and PDU session establishment service request may need to call the AUSF authentication service as a microservice. However, the UE registration service request has a larger number of further microservice calls in the sequence after the authentication than those in the PDU session establishment service request. Therefore, the time budget for the authentication service in the UE registration service request may be smaller than the time budget for the authentication service in the PDU session establishment service request. Hence it may be desirable that AUSF prioritizes the authentication request for the UE registration procedure.

In embodiments described herein therefore the service request invoking a microservice chain may be scheduled dynamically in each microservice of the chain according to a dynamically modified latency requirement based on the remaining service chain of the service request.

Figure 3:
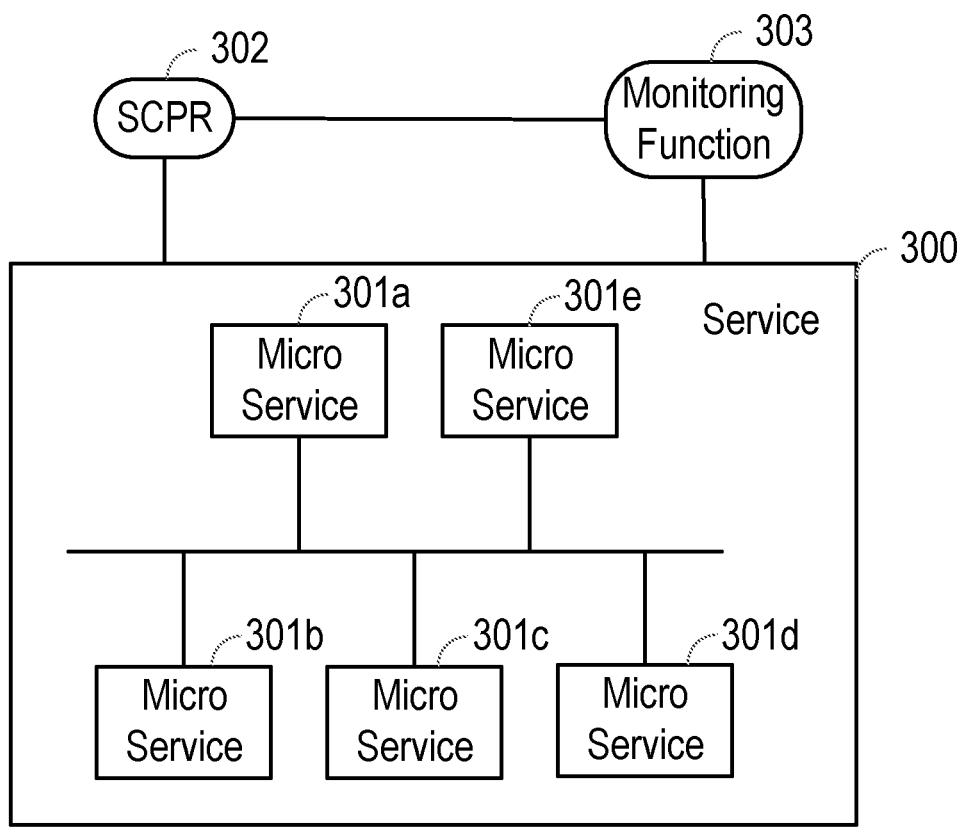
FIG. 3 illustrates an example of a microservice chain architecture.

FIG. 3 illustrates an example of a microservice chain architecture. The service 300 comprises a chain of microservices 301a to 301e. A request for the service from a client may invoke a microservice call sequence to implement each of the microservices 301a to 301e. A SCPR (Service Chain Procedure Repository) 302 may be used to store Service Chain Procedures (SCPs) associated with different services (for example, the type of request).

A Service Chain Procedure for a service (or a type of request) may comprise the sequence of microservices for that service. The Service Chain Procedure may also comprise information relating to a step latency associated with each step in the sequence of microservices, wherein a step comprises one of a microservice in the sequence or a hop between pair of adjacent microservices in said sequence. The SCP may also comprise information relating to a latency requirement associated with the sequence of microservices.

An example Service Chain Procedure may be given as: {p1, rt, $L_r$, (s1, s2, s4), (<s1, 5 ms>, <s1-s2, 10 ms>, <s2, 3 ms>, <s2-s4, 5 ms>, <s4, 5 ms>)}
in which 'p1' is the identity of the SCP, 'rt' denotes the type of the request (for example, the service), '$L_r$' denotes the total latency requirement on this type of request, (s1, s2, s4) describes the service call sequence of this type of request, and {<s1, 5 ms>, <s1-s2, 10 ms>, <s2, 3 ms>, <s2-s4, 5 ms>, <s4, 5 ms>} denotes the corresponding estimated latency for each step in this sequence of microservices.

The sequence of microservices may be determined by analyzing the internal logic of the service for each type of request. Usually the sequence of microservices is static when the service is implemented and may only need be changed when the internal structure and interfaces of the service is changed.

The estimated latency for each step in the sequence of microservices may be generated by a monitoring function 303, which may consistently monitor the latency introduced in each microservice and the latency between two microservices.

The monitoring function 303 may therefore be configured to monitor one or more microservices (for example microservice 301a to 301e) to obtain the information relating to a step latency associated with each step in at least one sequence of microservices, wherein a step comprises one of a microservice or a hop between pair of adjacent microservices in said sequence. The monitoring function 303 may also then be configured to transmit the information to the SCPR 302.

The SCPR 302 may retrieve the latest estimated latency for all stored Service Chain Procedure from the Monitoring Function 303. The information relating to the estimated latencies may be obtained periodically, or may be obtained responsive to a new service request, or any other suitable method.

The microservices 301a to 301e within the service 300 may retrieve the Service Chain Procedure (SCP) from the SCPR 302 and may synchronize with the SCPR 302 periodically.

The SCPR 302 may therefore be configured to receive a sequence request from a first microservice (for example microservice 301a), wherein the sequence request comprises a type of request. The type of request may for example indicate the service 300. The SCPR 302 may then select a first sequence from one or more stored sequences, wherein the first sequence is associated with the type of request. For example, the SCPR 302 may select the SCP associated with the service indicated in the sequence request.

The SCPR 302 may then transmit the first sequence (for example, the SCP) to the first microservice.

Figure 4:
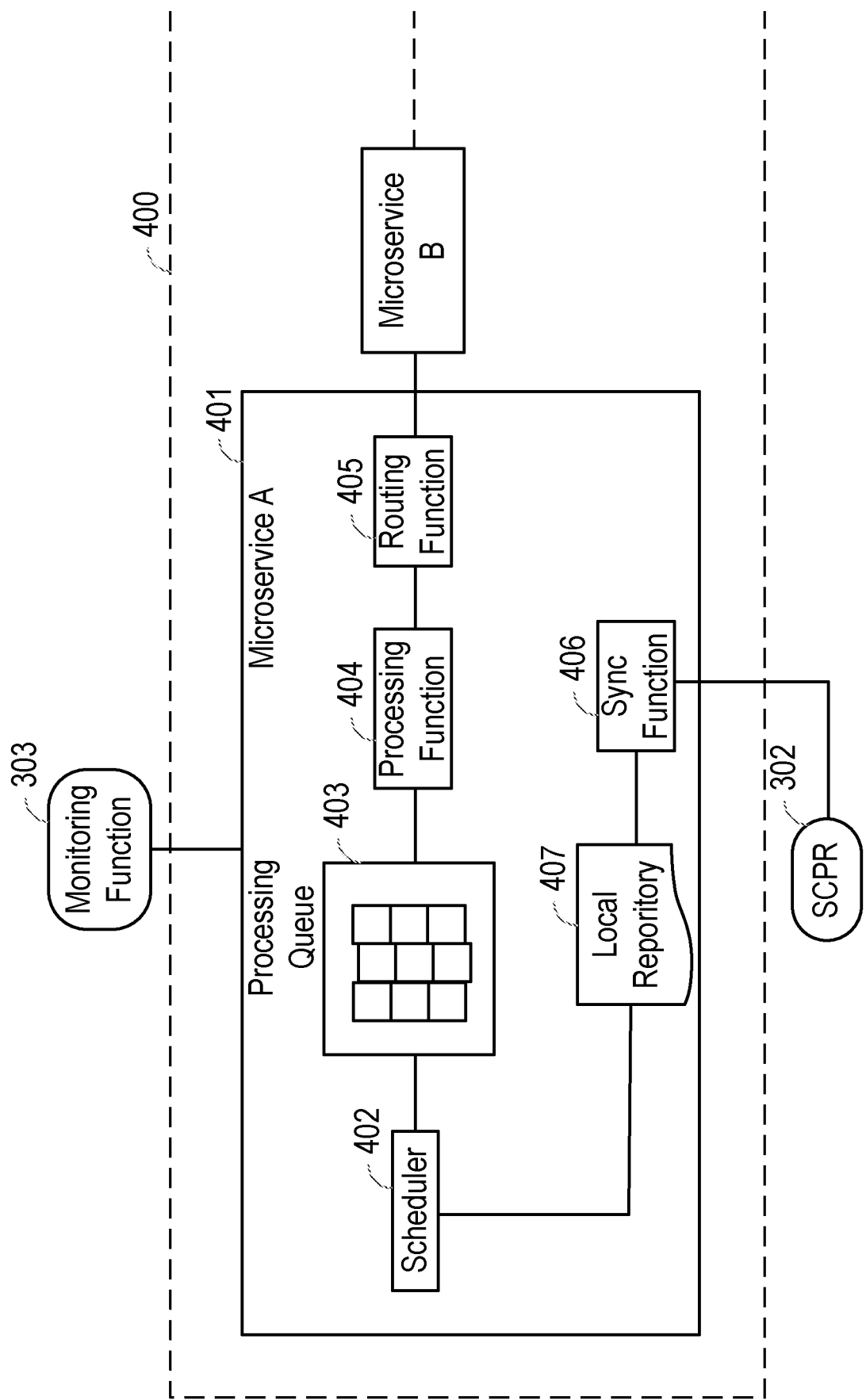
FIG. 4 illustrates a microservice in a service.

FIG. 4 illustrates a microservice 401 in a service 400.

In this example, the microservice 401 comprises several functions: a scheduler 402, Processing Queue (PQ) 403, Processing Function (PF) 404, Routing Function (RF) 405, Synchronization Function (SF) 406, and Local Repository 407. These functions shown in the figure may be contained within each microservice in the sequence.

It will be appreciated that the functional blocks illustrated in FIG. 4 may be implemented differently, and that different steps of the method described below in FIG. 5 may be implemented by one or more of the functional blocks, or additional functional blocks.

Figure 5:
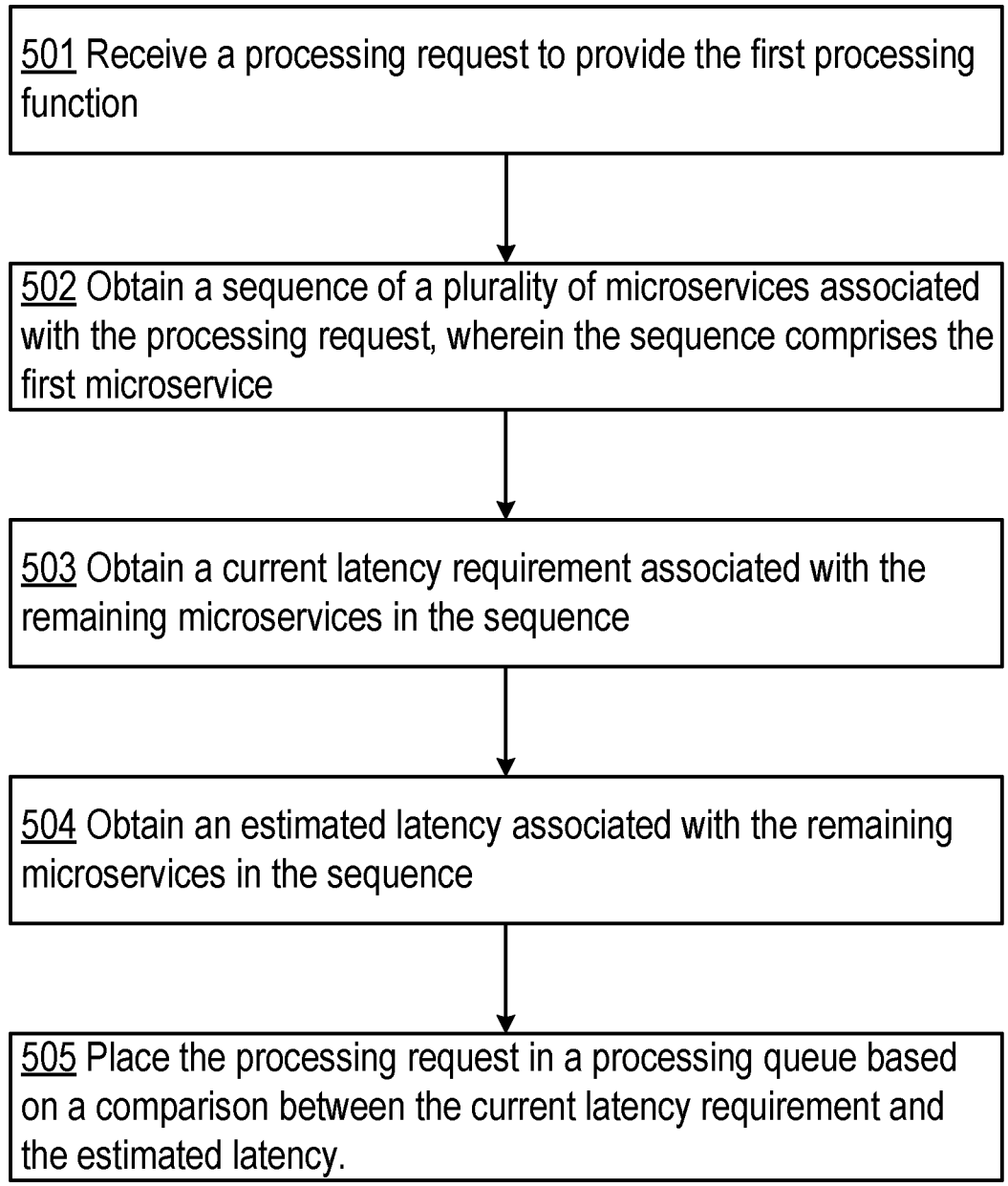
FIG. 5 illustrates a method performed by a microservice.

FIG. 5 illustrates a method performed by a microservice, for example the microservice 401 illustrated in FIG. 4.

In step 501, the microservice receives a processing request to provide a first processing function. For example, the processing request may be received at the scheduler 402. The first processing function may be the function performed by the Processing Function 404.

In step 502 the microservice obtains a sequence of a plurality of microservices associated with the processing request, wherein the sequence comprises the first microservice.

Step 502 may for example comprise the scheduler 402 transmitting a sequence request to a local repository comprising a type of request associated with the processing request; and receiving the sequence from the local repository. For example, the scheduler 402 may retrieve an SCP from the local repository 407. The local repository 407 may be updated by the Synchronization Function 406, which may receive the SCPs from the SCPR 302. The updates from the SCPR may, for example, be received periodically, or when there is some change to an SCP that the SCPR 302 reports to the local repository 407.

The SCPs received from the SCPR 302 may be SCPs that are in use by the local repository 407. For example, if the local repository 407 has not received a sequence request from the scheduler for a type of request associated with a particular SCP for a predetermined period of time, it may signal to the SCPR to stop updating that particular SCP.

Also, if the local repository 407 receives a sequence request for a type of request associated with an SCP that has not been updated for a predetermined period of time, or that the local repository does not have stored, the local repository 407 may retrieve the SCP from the SCPR 302.

In step 503, the microservice obtains a current latency requirement associated with the remaining microservices in the sequence. For example, the current latency requirement may be obtained based on a previous latency requirement that may form part the processing request. For example, the current latency requirement may indicate a latency requirement or target associated with the remainder of the microservices in the sequence including the current microservice. This may be calculated from the previous latency requirement which was the determined current latency requirement by the previous microservice in the sequence (or the original total latency requirement). The previous latency requirement may be received as a field in the processing request.

In step 504, the microservice obtains an estimated latency associated with the remaining microservices in the sequence. For example, the estimated latency associated with the remaining microservices in the sequence may be calculated (for example by the scheduler 402) from the information in the SCP relating to the estimated latency associated with each step in the sequence. An example of how the estimated latency associated with the remaining microservices may be obtained is described in more detail with reference to FIG. 6 below.

In step 506, the microservice places the processing request in a processing queue based on a comparison between the current latency requirement and the estimated latency. For example, the scheduler 402 may place the processing request in the Processing Queue 403.

The scheduler 402 may therefore be configured to receive the processing request either from a user or application directly or from a previous microservice in the sequence, and may then schedule the processing request into the Processing Queue 403 according the priority of the processing request which may be determined based on one or more conditions.

The microservice may then also process requests in the processing queue by providing the first processing function to requests in the processing queue in an order according to priority of the processing requests in the processing queue.

In some embodiments, the Processing Queue 403 may comprise several queues which have different priorities to be processed by the Processing Function (PF). The PF is the function that process the processing request by performing the first processing function, and for each microservice, the function performed by the processing function 404 may be different.

As each microservice may have multiple instance running in the cloud platform, if the current microservice need call another microservice, the Routing Function (RF) 405 may be responsible for choosing a running instance of the next microservice in the sequence.

In order for the microservice to determine the current latency requirement and the estimated requirement, a number of additional fields may be included in the processing request. For example, the processing request may comprise fields indicating: the type of request, the previous latency requirement, and a timestamp. The type of request indicates the type of the current service request which can be used to retrieve the SCP as described above. The type of request may be set once by either an application or user, or by an entry microservice, i.e., the first microservice in the sequence that serves the request. The previous latency requirement denotes the desired maximum latency for remainder of the sequence of microservices. It is set by the entry microservice initially (as the total latency requirement which may be obtained as part of the SCP), and may be dynamically adjusted by the following serving microservices in the sequence. The timestamp denotes the time when each microservice receives the request. It may be assumed the time clock at each microservice is synchronized by protocols for example Network Time Protocol (NTP).

Figure 6A:
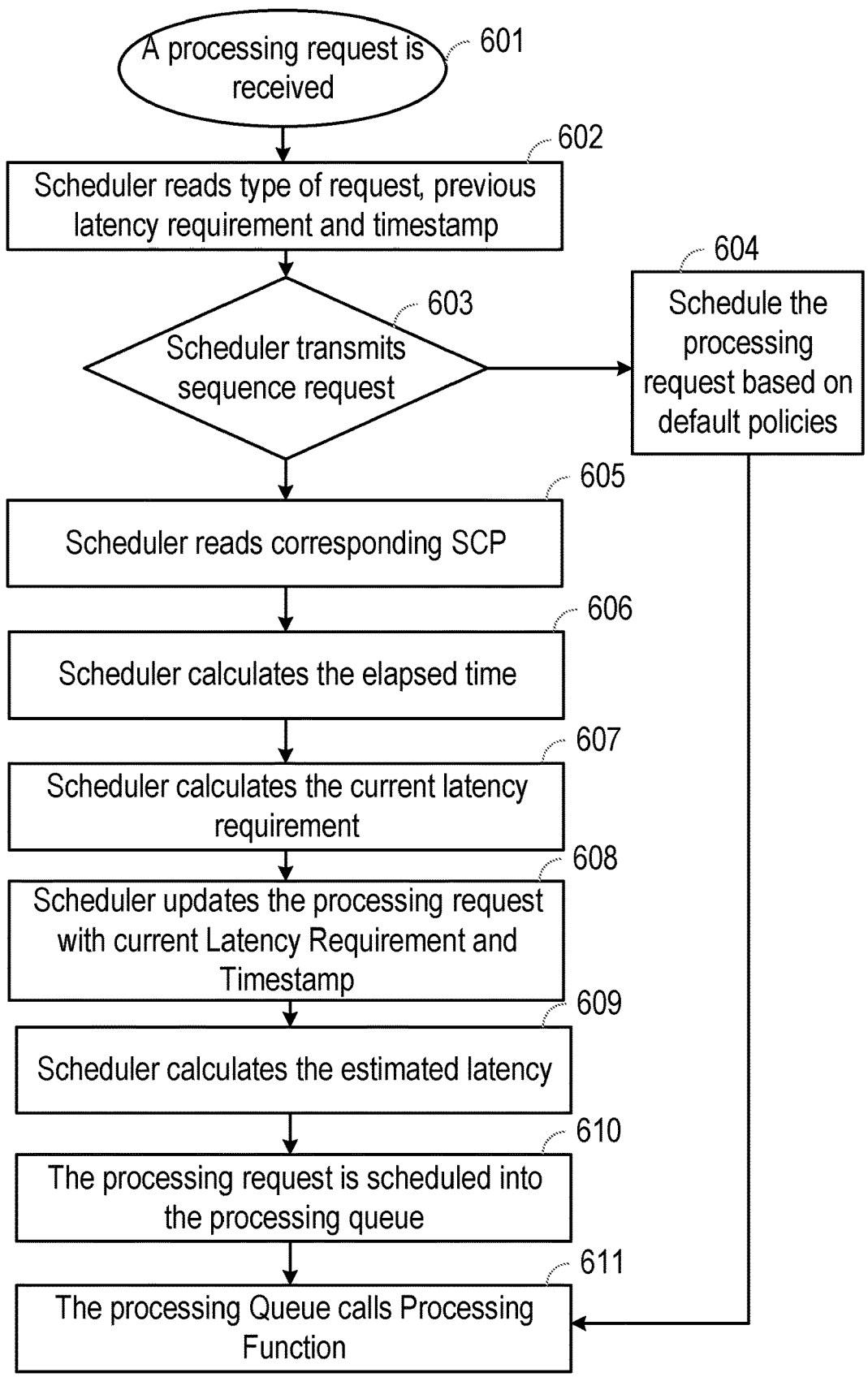
FIGS. 6a and 6b illustrate an example of the scheduling and processing of a processing request by a microservice.
Figure 6B:
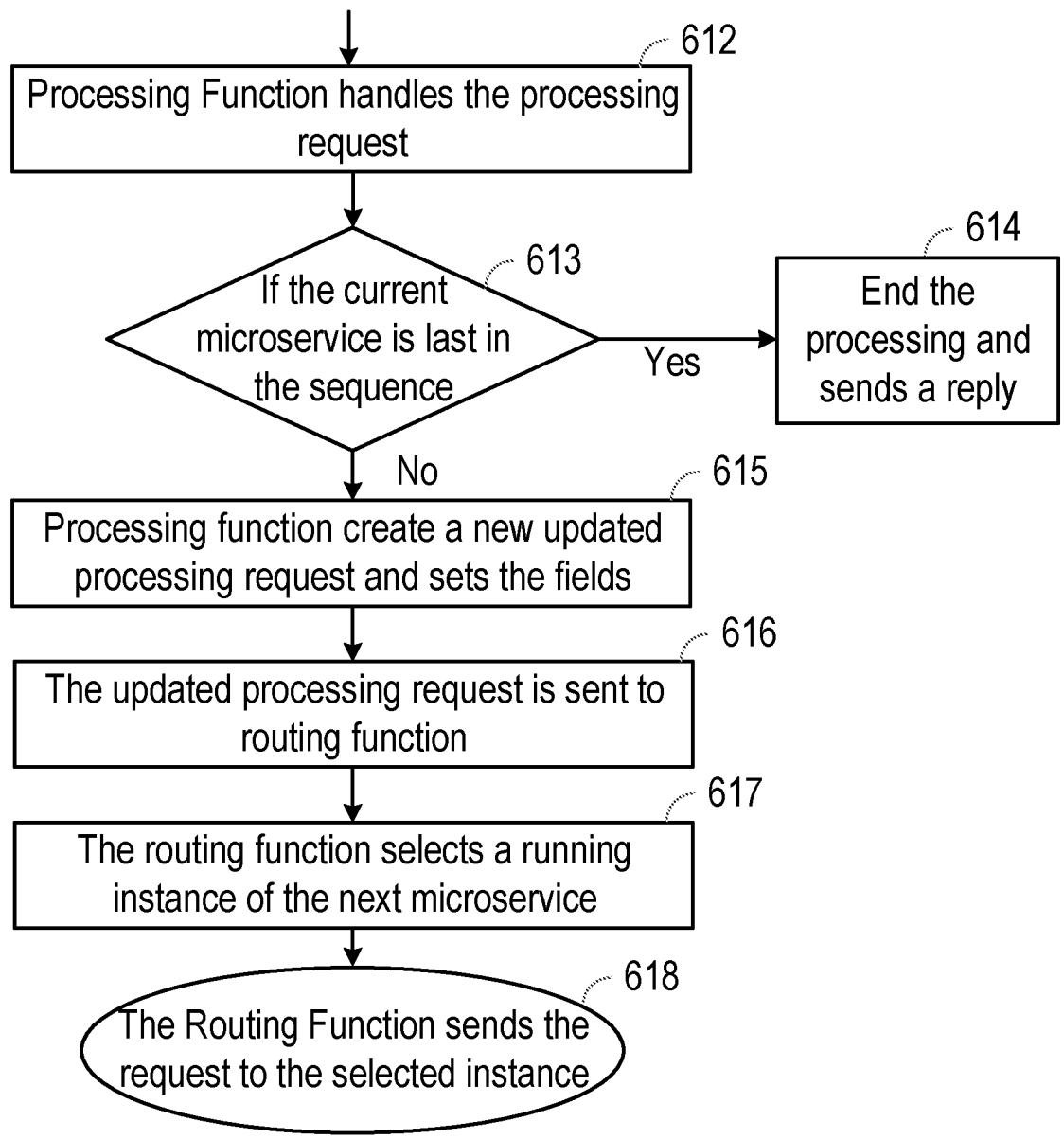

FIGS. 6a and 6b illustrate an example of the scheduling and processing of a processing request by a microservice.

In step 601, a processing request is received. As previously described the processing request may be received from a user or application (for example, where the receiving microservice is the first microservice in the sequence), or from a previous microservice in the sequence.

In step 602, the scheduler reads the type of request, previous latency requirement and the timestamp from the processing request.

In step 603, the scheduler transmits a sequence request to the local repository comprising the type of request read from the processing request in step 602. As previously mentioned, the local repository may retrieve the SCP from the SCPR 302 if the stored SCP is not up to date, or is missing. In some cases, there may be no corresponding SCP for the type of request, and default policies may be used to schedule the processing request into the processing queue 404 in step 604.

In step 605, the scheduler 402 reads the SCP retrieved in step 603.

In step 606, the scheduler 402 may calculate an elapsed time by comparing the timestamp to a current time.

For example, the scheduler 402 may calculate the elapsed time ($L_e$) for the received processing request as the difference between the timestamp ($T_t$) and the current time according to the microservice ($T_c$), which could be denoted as $L_e = T_c - T_t$.

In examples where the microservice receiving the processing request is the first microservice in the sequence, the elapsed time may be zero.

In step 607, the scheduler 402 may calculate the current latency requirement ($L_{r\_c}$). If the microservice receiving the processing request is the first microservice in the sequence then the current latency requirement may be set equal to the total latency requirement $L_r$ in the SCP. Otherwise, the current latency requirement ($L_{r\_c}$) may be calculated as $L_{r\_c} = L_{r\_p} - L_e$, in which $L_{r\_p}$ is the previous latency requirement read from the processing request in step 602.

In step 608 the scheduler 402 may updating the processing request by updating the previous latency requirement field with the value of the current latency requirement calculated in step 607. The scheduler 402 may also update the timestamp field in the processing request with the current time.

In step 609, the scheduler 402 calculates the estimated latency ($L_{tes}$). In particular, as previously mentioned, the sequence (e.g. to SCP) comprises an indication of a step latency associated with each step in the sequence, wherein a step comprises one of a microservice or a hop between pair of adjacent microservices in the sequence.

Step 609 may therefore comprise calculating a sum of the step latencies associated with each remaining step in the sequence. For example, for the SCP:
(p1, rt, $L_r$, (s1, s2, s4), (<s1, 5 ms>, <s1-s2, 10 ms>, <s2, 3 ms>, <s2-s4, 5 ms>, <s4, 5 ms>))

If the current microservice is s2, then the remaining steps in the sequence are:
<s2, 3 ms>, <s2-s4, 5 ms>, <s4, 5 ms>.

Therefore the estimated latency associated with the remainder of the sequence ($L_{tes}$) in this example is 13 ms.

In step 610, the scheduler 402 places the processing request in the processing queue 405.

For example, the scheduler may schedule the request based on the calculated values of $L_{r\_c}$, $L_{tes}$ and the type of the Processing Queue. For example, the Processing Queue may comprise a multi-level queue, in other words, a queue with a pre-defined number of levels. The processing request may then be assigned a particular level or priority. Each level of the processing queue 405 may use its own scheduling for example, a round-robin.

For example, if the Processing Queue is a three-level queue (q1, q2, q3), in which q3 has the highest priority, and q1 has the lowest priority.

The scheduler may calculate a value delta, $\Delta$, where $\Delta = (L_{r\_c} - L_{tes})/L_{r\_c}$. The scheduler may then, position the processing request in the processing queue based on the value of delta. In some examples, the scheduler may position the processing request with higher priority in the processing queue with increasing delta.

In this example, if $|\Delta| < \mu$, then the processing request may be assigned to level q2, i.e., the middle level; if $\Delta \geq \mu$, the processing request may be assigned to level q1; if $\Delta \leq -\mu$, the processing request may be assigned to level q3. $\mu$ may be a predefined parameter, e.g., it may be set to 0.1.

For example, if microservice s2 receives a processing request whose SCP is {p1, t1, 30 ms, (s1, s2, s4), (<s1, 5 ms>, <s1-s2, 10 ms>, <s2, 3 ms>, <s2-s4, 5 ms>, <s4, 5 ms>)}, The measured elapsed latency ($L_e$) from s1 to s2 is 20 ms, then the new latency requirement $L_{r\_c} = L_{p,r} - L_e = 10$ ms. The total estimated latency ($L_{te}$) of the remaining sequence is <s2>+<s2-s4>+<s4>=13 ms. Thus, in this example, $\Delta = -0.3$, if $\mu$ is set to 0.1, the processing request may be assigned to level q3 which has the highest priority. It will be appreciated that other types of queue and other scheduling algorithms may be used.

In step 611, the queue provides the processing requests in the processing queue to the processing function 404 to be processed in an order according to priority in the processing queue. For example, in the example described above, the processing queue may provide requests in the queue q3 to the processing function to be processed before providing the processing requests in the queue q2. Similarly, the processing requests in the queue q2 may be processed before the requests in q1.

In step 612, the processing function 404 handles the processing request. For example, the processing function 404 may perform the first processing function.

In step 613 the processing function 404 determines whether there are any further microservices in the sequence. If there are no further microservices in the sequence, the method passes to step 614 in which the processing ends and a reply can be sent to the user or application on completion of the service.

If there are further microservices in the sequence, the method passes to step 615 in which, the processing function 404 updates the processing request to generate an updated processing request with the appropriate field values as set in step 608.

In step 616 the updated processing request is sent to the routing function 405.

In step 617, the routing function 405 selects a running instance of the next microservice in the sequence, for example, according to pre-defined routing and load balancing policies. Optionally, the routing function 405 may also select the instance according to the calculated value of $\Delta$. For example, if $\Delta<0$, the routing function 405 could select a running instance that has less than average estimated latency between it and the current microservice instance.

In step 618, the routing function 405 transmits the updated processing request to the selected instance of the next microservice in the sequence.

Figure 7:
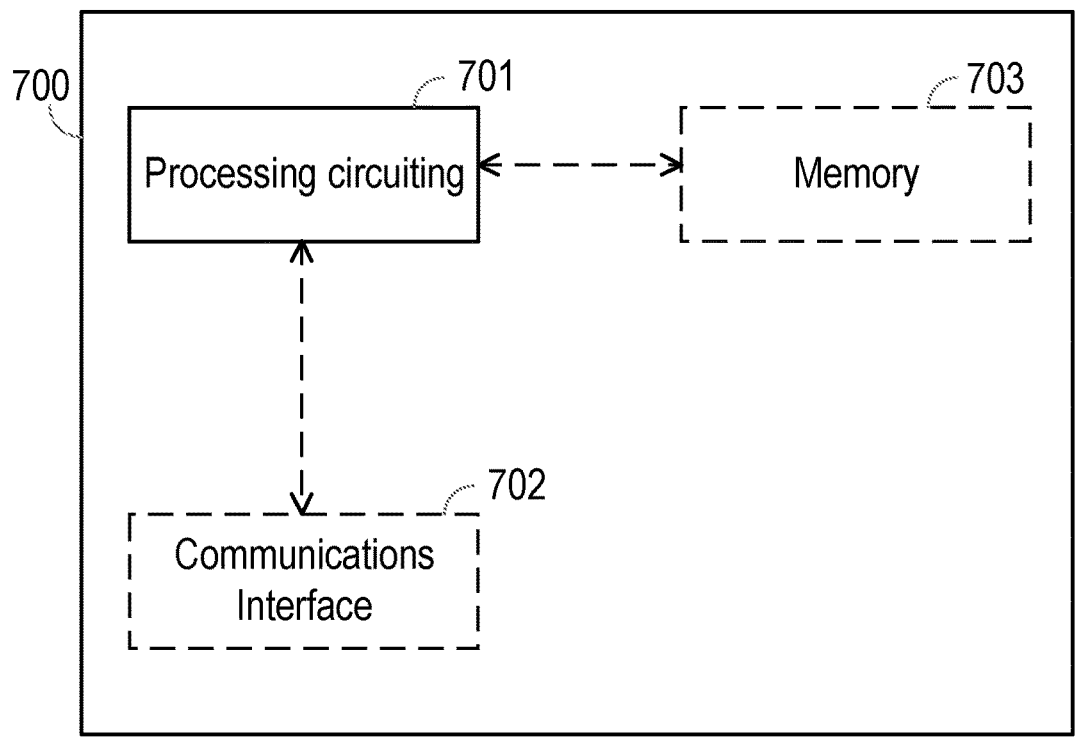
FIG. 7 illustrates a computer system comprising processing circuitry (or logic)

FIG. 7 illustrates a computer system 700 comprising processing circuitry (or logic) 701. The processing circuitry 701 controls the operation of the computer system 700 and can implement the method described herein in relation to a first microservice. The processing circuitry 701 can comprise one or more processors, processing units, multi-core processors or modules that are configured or programmed to control the computer system 700 in the manner described herein. In particular implementations, the processing circuitry 701 can comprise a plurality of software and/or hardware modules that are each configured to perform, or are for performing, individual or multiple steps of the method described herein in relation to the first microservice.

Briefly, the processing circuitry 701 of the computer system 700 is configured to: receive a processing request to provide the first processing function; obtain a sequence of a plurality of microservices associated with the processing request, wherein the sequence comprises the first microservice; obtain a current latency requirement associated with the remaining microservices in the sequence; obtain an estimated latency associated with the remaining microservices in the sequence; place the processing request in a processing queue based on a comparison between the current latency requirement and the estimated latency.

In some embodiments, the computer system 700 may optionally comprise a communications interface 702. The communications interface 702 of the microservice 700 can be for use in communicating with other nodes, such as other virtual nodes. For example, the communications interface 702 of the computer system 700 can be configured to transmit to and/or receive from other nodes requests, resources, information, data, signals, or similar. The processing circuitry 701 of the computer system 700 may be configured to control the communications interface 702 of the computer system 700 to transmit to and/or receive from other nodes requests, resources, information, data, signals, or similar.

The computer system 700 comprises a memory 703 containing the first microservice which, when executed by the processing circuitry instructs the processing circuitry to perform the steps described above. In some embodiments, the memory 703 of the computer system 700 can be configured to store program code that can be executed by the processing circuitry 701 of the microservice 700 to perform the method described herein in relation to the microservice 700. Alternatively or in addition, the memory 703 of the computer system 700, can be configured to store any requests, resources, information, data, signals, or similar that are described herein. The processing circuitry 701 of the computer system 700 may be configured to control the memory 703 of the computer system 700 to store any requests, resources, information, data, signals, or similar that are described herein.

Figure 8:
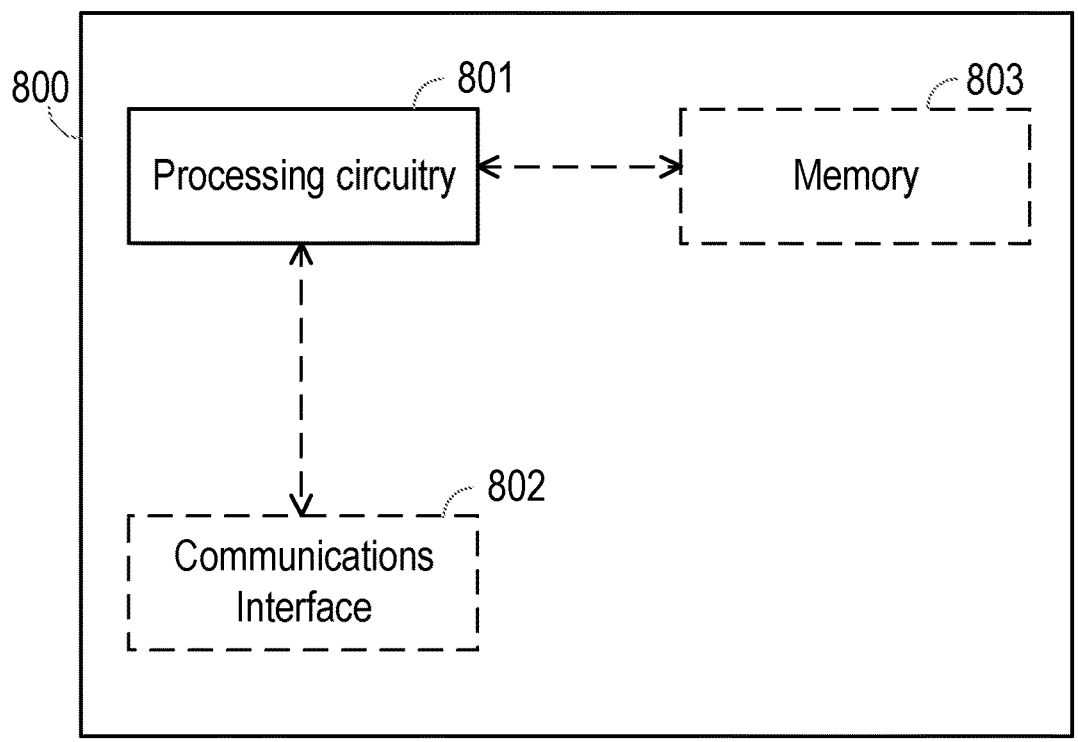
FIG. 8 illustrates a SCPR comprising processing circuitry (or logic)

FIG. 8 illustrates a SCPR 800 comprising processing circuitry (or logic) 801. The processing circuitry 801 controls the operation of the SCPR 800 and can implement the method described herein in relation to an SCPR 800. The processing circuitry 801 can comprise one or more processors, processing units, multi-core processors or modules that are configured or programmed to control the SCPR 800 in the manner described herein. In particular implementations, the processing circuitry 801 can comprise a plurality of software and/or hardware modules that are each configured to perform, or are for performing, individual or multiple steps of the method described herein in relation to the SCPR 800.

Briefly, the processing circuitry 801 of the SCPR 800 is configured to: store at least one sequence of microservices; and store information relating to a step latency associated with each step in each sequence of microservices, wherein a step comprises one of a microservice in the sequence or a hop between pair of adjacent microservices in said sequence.

In some embodiments, the SCPR 800 may optionally comprise a communications interface 802. The communications interface 802 of the SCPR 800 can be for use in communicating with other nodes, such as other virtual nodes. For example, the communications interface 802 of the SCPR 800 can be configured to transmit to and/or receive from other nodes requests, resources, information, data, signals, or similar. The processing circuitry 801 of the SCPR 800 may be configured to control the communications interface 802 of the SCPR 800 to transmit to and/or receive from other nodes requests, resources, information, data, signals, or similar.

Optionally, the SCPR 800 may comprise a memory 803. In some embodiments, the memory 803 of the SCPR 800 can be configured to store program code that can be executed by the processing circuitry 801 of the SCPR 800 to perform the method described herein in relation to the SCPR 800. Alternatively or in addition, the memory 803 of the SCPR 800, can be configured to store any requests, resources, information, data, signals, or similar that are described herein. The processing circuitry 801 of the SCPR 800 may be configured to control the memory 803 of the SCPR 800 to store any requests, resources, information, data, signals, or similar that are described herein.

Figure 9:
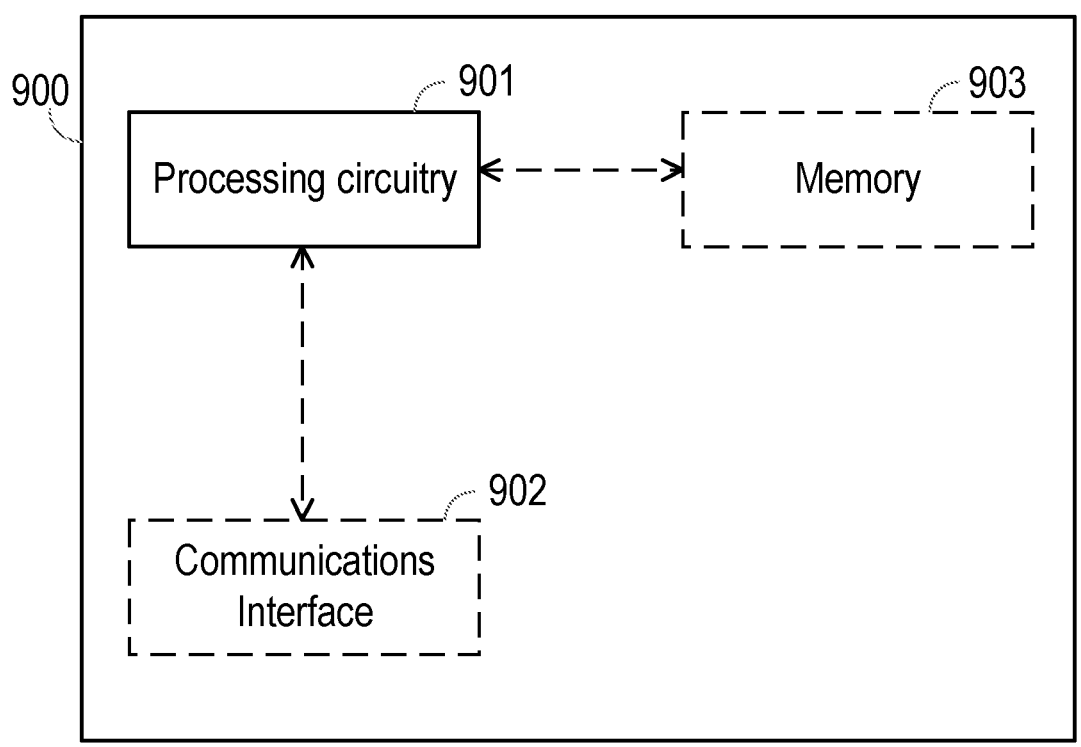
FIG. 9 illustrates a monitoring function comprising processing circuitry (or logic).

FIG. 9 illustrates a monitoring function 900 comprising processing circuitry (or logic) 801. The processing circuitry 901 controls the operation of the monitoring function 900 and can implement the method described herein in relation to an monitoring function 900. The processing circuitry 901 can comprise one or more processors, processing units, multi-core processors or modules that are configured or programmed to control the monitoring function 900 in the manner described herein. In particular implementations, the processing circuitry 901 can comprise a plurality of software and/or hardware modules that are each configured to perform, or are for performing, individual or multiple steps of the method described herein in relation to the monitoring function 900.

Briefly, the processing circuitry 901 of the monitoring function 900 is configured to: monitor one or more microservices to obtain information relating to a step latency associated with each step in at least one sequence of microservices, wherein a step comprises one of a microservice or a hop between pair of adjacent microservices in said sequence; and transmit the information to a service call procedure repository.

In some embodiments, the monitoring function 900 may optionally comprise a communications interface 902. The communications interface 902 of the monitoring function 900 can be for use in communicating with other nodes, such as other virtual nodes. For example, the communications interface 902 of the monitoring function 900 can be configured to transmit to and/or receive from other nodes requests, resources, information, data, signals, or similar. The processing circuitry 901 of the monitoring function 900 may be configured to control the communications interface 902 of the monitoring function 900 to transmit to and/or receive from other nodes requests, resources, information, data, signals, or similar.

Optionally, the monitoring function 900 may comprise a memory 903. In some embodiments, the memory 903 of the monitoring function 900 can be configured to store program code that can be executed by the processing circuitry 901 of the monitoring function 900 to perform the method described herein in relation to the monitoring function 900. Alternatively or in addition, the memory 903 of the monitoring function 900, can be configured to store any requests, resources, information, data, signals, or similar that are described herein. The processing circuitry 901 of the monitoring function 900 may be configured to control the memory 903 of the monitoring function 900 to store any requests, resources, information, data, signals, or similar that are described herein.

Embodiments described herein therefore provide methods and apparatuses for providing a first processing function in a first microservice. In particular, the methods and apparatuses described herein allow for dynamically prioritizing the processing requests based on the real time measured latency and estimated latency together, so that the latency requirement for the processing requests can be better fulfilled in each microservice in the sequence. The proposed mechanism may also be applied to other chain-based services in addition to microservice based services. The proposed mechanism may also be applied to service mesh based microservices.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a first microservice capable of providing a first processing function in a service comprising a plurality of microservices, the method comprising:
receiving a processing request to provide the first processing function;
receiving a sequence of a plurality of microservices associated with the processing request from a local repository, the local repository being updated by a Service Chain Procedure Repository, wherein the sequence comprises the first microservice;
obtaining a current latency requirement associated with remaining microservices in the sequence;
obtaining an estimated latency associated with the remaining microservices in the sequence; and
placing the processing request in a processing queue based on a comparison between the current latency requirement and the estimated latency.

2. The method as claimed in claim 1 further comprising:
receiving the processing request from a previous microservice in the sequence, an application or a user.

3. The method as claimed in claim 1 wherein the step of retrieving comprises:
transmitting a sequence request to the local repository comprising a type of request associated with the processing request; and
receiving the sequence from the local repository.

4. The method as claimed in claim 1, wherein the processing request comprises a timestamp.

5. The method as claimed in claim 1, wherein the processing request comprises a previous latency requirement.

6. The method as claimed in claim 5 wherein the processing request comprises a timestamp, and, wherein the step of obtaining the current latency requirement comprises:
calculating an elapsed time by comparing the timestamp to a current time; and
subtracting the elapsed time from the previous latency requirement to determine the current latency requirement.

7. The method as claimed in claim 6 further comprising:
updating the processing request by:
updating the timestamp with the current time, and
updating the previous latency requirement with the current latency requirement.

8. The method as claimed in claim 7 further comprising:
transmitting the updated processing request to a next microservice in the sequence.

9. The method as claimed in claim 1 wherein the sequence comprises an indication of a step latency associated with each step in the sequence, wherein a step comprises one of a microservice or a hop between pair of adjacent microservices in the sequence.

10. The method as claimed in claim 6 wherein the step of obtaining an estimated latency associated with the remaining microservices in the sequence comprises:
calculating a sum of the step latencies associated with each remaining step in the sequence.

11. The method as claimed in claim 1 further comprising comparing the current latency requirement to the estimated latency by calculating delta, $\Delta$, where $\Delta=(L_{r,c} - L_{tes})/ L_{r,c}$, where $L_{tes}$ is the estimated latency and $L_{r,c}$ is the current latency requirement.

12. The method as claimed in claim 1 wherein the step of placing the processing request in a processing queue comprises:
positioning the processing request in the processing queue based on a value of delta.

13. The method as claimed in claim 1 further comprising:
processing requests in the processing queue by providing the first processing function to requests in the processing queue in an order according to priority in the processing queue.

14. A computer system comprising processing circuitry and a memory containing a first microservice capable of providing a first processing function in a service comprising a plurality of microservices, which, when executed by the processing circuitry instructs the computer system to perform operations comprising:
receiving a processing request to provide the first processing function;

obtaining a sequence of a plurality of microservices associated with the processing request, wherein the sequence comprises the first microservice;
obtaining a current latency requirement associated with remaining microservices in the sequence;
obtaining an estimated latency associated with the remaining microservices in the sequence; and
placing the processing request in a processing queue based on a comparison between the current latency requirement and the estimated latency.

* * * * *